July 27, 1971  J. W. ELDRED ETAL  3,595,637
PLUNGER HEAD ASSEMBLY FOR USE IN A GLASS PRESSING MACHINE
Filed Feb. 14, 1969  6 Sheets-Sheet 2

INVENTORS
JOHN W. ELDRED
JAMES B. LEGG
CECIL W. McCREERY
BY MAHONEY, MILLER & RAMBO
BY *Wm. V. Miller*
ATTORNEYS

3,595,637
PLUNGER HEAD ASSEMBLY FOR USE IN A GLASS PRESSING MACHINE

John W. Eldred, James B. Legg, and Cecil W. McCreery, Columbus, Ohio, assignors to The Eldred Company, Columbus, Ohio
Filed Feb. 14, 1969, Ser. No. 799,481
Int. Cl. C03b 11/06
U.S. Cl. 65—318    15 Claims

ABSTRACT OF THE DISCLOSURE

A plunger head assembly mounted on a glass pressing or forming machine to cooperate with a press mold on the movable mold table thereof, the mounting being such that quick removal and replacement of the plunger head is possible. Also, it is provided with means permitting self-centering thereof relative to the mold with which it cooperates. In addition, the head assembly is such that the forming pressure for forming the glass charge in the mold is applied through actual rigid contact of relatively movable members of the assembly and after formation, the forming pressure is released and lesser but sufficient pressure is applied by fluid pressure means to maintain contact of the forming part of the plunger until the formed glass sufficiently cools and sets to retain its shape.

---

The plunger assembly of this invention may be used in conjunction with various types of glass presses or molding machines, for example, one of the type illustrated in the copending application of Eldred et al., Ser. No. 597,601 filed Nov. 29, 1966.

There is a need in the art for a pressing plunger assembly for use with glass molding machines of the type indicated in which the forming plunger unit can be readily mounted on the machine or be removed therefrom, to permit replacement with similar units for pressing articles of other form or for replacement after wear. Also, there is a need for a plunger assembly which will center itself, relative to the mold with which it is used. The present invention provides a means for mounting the plunger unit and accurately centering it relative to the cooperating mold, with means for firmly locking the unit in such centered position, such means being readily releasable to permit slipping out of the unit and slipping into position of another similar unit. There is also a need for an arrangement which will keep the forming plunger in contact with the molded blank until it cools and sets, without making it necessary to stop the machine to maintain the high pressure used in the forming operation. The present invention provides for the development of high forming pressure through actual contact or abutment of relatively movable members of the plunger head assembly and then the application of a lesser holding pressure during the continuous movement of the machine by fluid means to maintain contact between the plunger and the formed article for a sufficient period to allow cooling and setting of the article.

In the accompanying drawings a preferred form of plunger head assembly embodying the present invention is illustrated and in these drawings:

FIG. 6 is a similar view but showing the parts returned to their initial positions which they occupy prior to the pressing operation.

Figure 1:
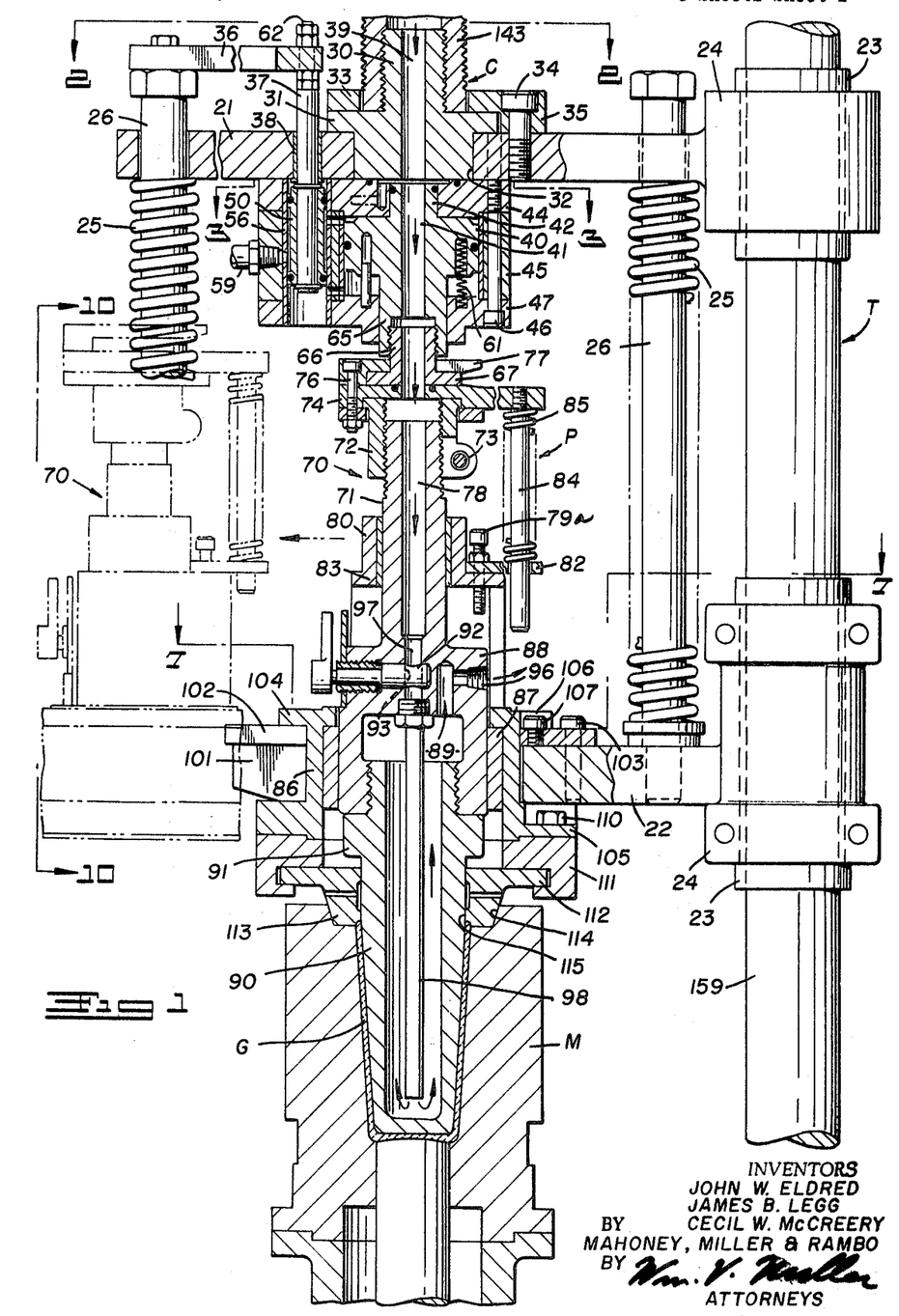
FIG. 1 is a vertical sectional view through the assembly, part of which is shown angularly displaced out of its actual position for clarity, with the plunger thereof in position to press the glass charge in the cooperating mold.
Figure 7:
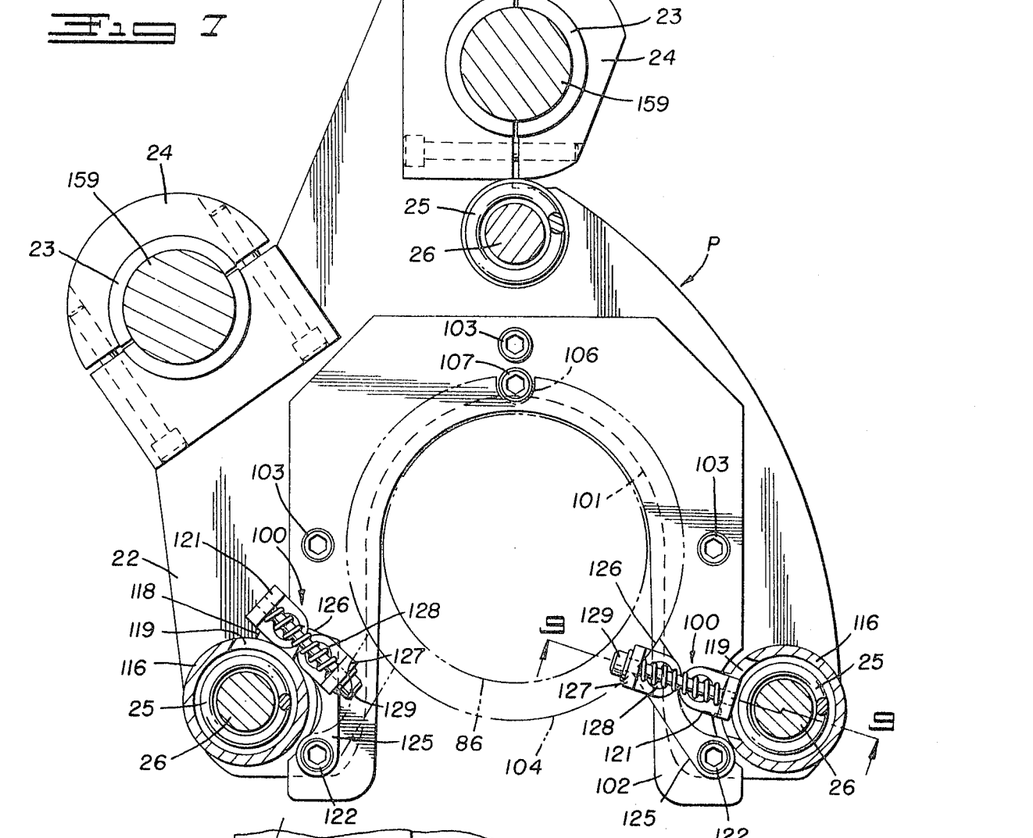
FIG. 7 is a horizontal sectional view taken along line 7—7 of FIG. 1.

As indicated above, the plunger head assembly of this invention is applicable to a molding machine of the type disclosed in said copending application and parts of which are indicated in the drawings and especially in FIG. 1. The machine includes a revolving mold table, carrying upwardly opening, angularly spaced molds, one of which is indicated at M. This mold table is part of a revolving turret T which includes vertically disposed, axially fixed, guide rods 159 that move around with the turret. The plunger head assemblies of this invention, indicated generally by the letter P, are mounted for vertical reciprocable movement at angularly spaced intervals on the turret by means of these guide rods and are moved by vertically reciprocable rods or other actuating members, for example, the rods or tubes 143 of that machine, each of which may have its lower end coupled at C at the top of the assembly P. It will be noted from FIG. 7 that each assembly P is reciprocably supported by two of the guide rods 159 which are parallel with each other and with the axis of the respective plunger assembly so that lateral displacement of the plunger axis will be precluded. Each plunger assembly is carried by an upper horizontally disposed support plate or arm 21 and a lower horizontally disposed support plate or arm 22 which are disposed in vertically spaced parallel planes. The support plates are vertically slidably mounted on the rods 159 so that the axes of the rods will always be normal with the planes of the plates. This is accomplished by means of the flanged bearing sleeves 23 slidable on the rods and about which split sleeves 24 carried by the plates are clamped. The upper plate 21 is movable downwardly toward the lower plate 22, under predetermined pressure, but is normally maintained in spaced relationship to the lower plate 22 by means of spreader units, each comprising a compression spring 25, disposed between and in engagement with both plates and surrounding a rod 26 which is anchored at its lower end to the lower plate 22 and has its headed end slidable in an opening in the upper plate 21. These units are illustrated in FIG. 7 as being three in number but may be used in other numbers. In FIG. 1, the unit to the left has been angularly displaced out of actual position so that it is visible.

Figure 2:
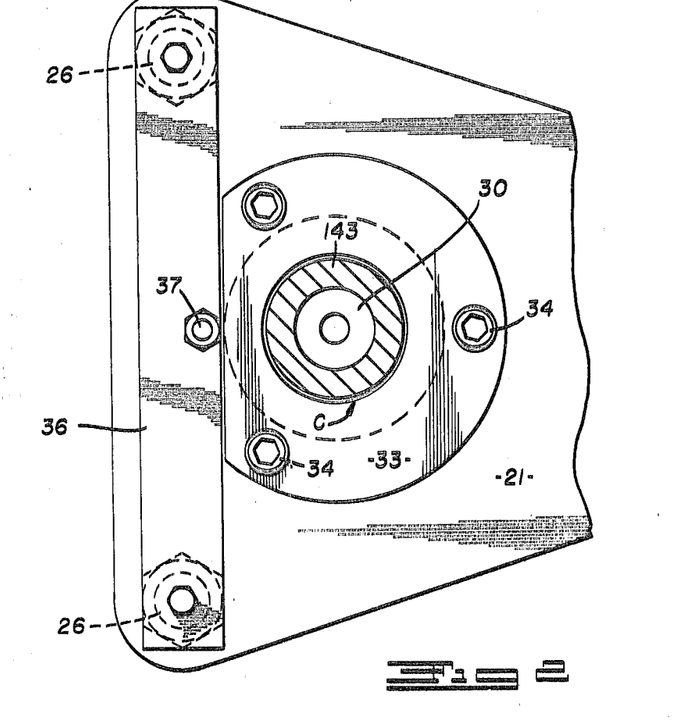
FIG. 2 is a horizontal sectional view taken along line 2—2 of FIG. 1.

With reference to FIGS. 1 and 2, the upper end of the assembly P is provided with an adapter 30 threaded exteriorly and screwed upwardly into a threaded socket in the lower end of the actuating rod 143 previously mentioned. This adapter has a flanged portion 31 which slips downwardly into an opening 32 in the upper support plate 21 and is held down in that position by means of a cup 33 which is bolted to the plate 21 by means of clamp bolts 34. It will be noted that the cup surrounds the lower end of the rod 143 and has a depending flange 35 held against the upper surface of the plate 21 and it will also be noted that this flange is absent at the flat outer side of the cup where a segment of the cup is missing. A valve actuating bar 36 extends across this flattened side of the cup and is carried by two of the rods 26. Midway of the length of this bar 36 a valve stem 37 is supported in depending relationship thereto and extends downwardly through a bushing 38 in an opening in the plate 21, being axially vertically adjustable therein. The adapter 30 is provided with a central fluid passage 39 which communicates with a similar passage 41 in a piston 40.

Figure 3:
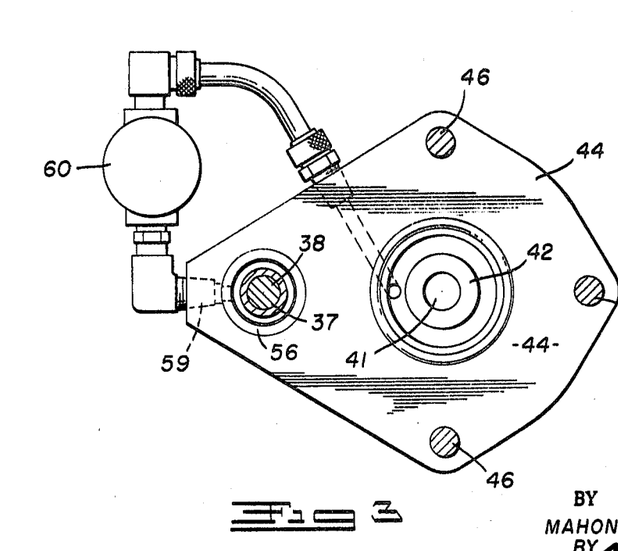
FIG. 3 is an enlarged horizontal sectional view taken along line 3—3 of FIG. 1.

The piston 40 is shown best in FIGS. 1 and 4–6, and it will be noted that it comprises a cylindrical body with a central guide boss 42 projecting upwardly therefrom slidably into a guide opening 43 in a top cylinder head 44 which is clamped against the lower surface of the plate 21. The headed bolts 46 pass upwardly through the bottom cylinder head 47, the cylinder 40, and the top cylinder head 44 and are threaded at their upper ends into the plate 21 to clamp all of these members together. The depending valve stem 37 has axially fixed on its lower portion a valve spool 50 which has axially spaced upper and lower valve portions 51 and 52 with an annular passageway 53 therebetween. Upper and lower passages 54 and 55 are provided in the wall of the cylinder 45 communicating with the interior thereof and with the valve sleeve 56 in which the spool 50 is slidably mounted, the sleeve 56 being open at its lower end. Intermediate the ports 54 and 55 leading through the sleeve 56 and always connected with the annular spool passageway 53 is a fluid supply port 59 connected to a suitable source of fluid under pressure, such as compressed air. This air may be received through an air cleaner 60 (FIG. 3). Compression springs 61 between the bottom head 47 and bottom surface of the piston 40 tend to bias the piston upwardly but its movement is positively controlled upwardly and downwardly by the control of pressure on its respective upper and lower surfaces as a result of the positioning of the valve spool 50 as will be explained in detail later. The initial axial position of the valve spool relative to the sleeve 56 may be accurately set by adjusting a stud 62 threaded into the upper end of the stem 37 and carrying the lock nuts 63 in cooperation with the bar 36. The piston 40 is provided with a central depending guide extension 65 having a downwardly opening socket into which is upwardly threaded a flanged suspending adapter 66 which has the supporting flange 67 at its lower side. Below this adapter is suspended the removable quick-change plunger head unit of the assembly which may be indicated generally by the numeral 70.

The plunger head unit 70 is shown best in FIGS. 1 and 7–11 and includes the plunger stem 71 which has a threaded upper end screwed into a clamp nut 72 which is interiorly threaded to receive it but is also provided with a split lower clamping section having a clamp bolt 73 cooperating therewith. The flanged upper end of this nut 72 is retained in a downwardly opening socket in a slip joint spacer 74 by means of a removable retainer ring 75 normally held in position by removable bolts 76 which extend downwardly through the spacer. The heads of these bolts also retain in position on the top of the spacer 74 (FIG. 11), vertically spaced therefrom by spacer flange 79, a slip flange member 77 which is of U-form to straddle normally the adapter 66 (FIG. 1) and rest on the flange 67 thereof which will be between the flange 77 and the spacer 74. The plunger stem 71 is provided with a central fluid passageway 78 which connects to the upper passageway 41 in the piston 40 through aligning passages in the members 72, 74, and 66. The stem 71 passes slidably through a bushing in a collar 80 which is on the upper portion of a mold ring supporting housing 83. A spring bracket 82 is bolted by bolts 81 (FIG. 10) to the upper surface of the housing 83 and a stop bolt 79a projects downwardly through the spring bracket and the upper part of the housing 83. Spring posts 84 are carried by and depend from the spacer 74 and extend slidably through guide openings in the bracket 82. Compression springs 85 surround the posts and normally bias the spacer 74 upwardly relative to the brackets 82 and the housing 83 which carries it. The housing 83 has a tubular guide and ring portion 86 on its lower end provided interiorly with a bushing 87 for guiding the lower enlarged cylindrical end 88 of the stem 71. Two opposed sides of the upper portion of the housing 83 are open below the collar 80 and above the tubular guide 86. The lower end of the screw 79a will contact the stem end 88 to limit relative axial movement of the stem and housing 83. The stem end 88 has a downwardly opening chamber 89 with a threaded socket into which is screwed the upper threaded end of the hollow plunger tip 90 which has a peripheral flange 91 adapted to contact with the lower extremity of the stem end portion 88 (FIG. 1). The passageway 78 in the stem receives cooling fluid, preferably air, for cooling the hollow plunger tip 90 and flow of air into this tip from the passageway is controlled by means of an adjustable valve member 92 mounted radially in the stem end 88 and having a transverse bore 93 which can be positioned relative to an extension 97 of the passage 78 by rotation of the valve member to vary the amount of cooling air flowing into the plunger tip. This valve member 92 can be rotated by a pointer handle 94 (FIGS. 10 and 11) mounted on an outward extension of it and which cooperates with a dial 95 carried on one side of the stem end 88. It will be noted (FIG. 11) that the valve extension extends radially outwardly through one of the open sides of the housing 83 and that limited vertical movement with the stem end 88 is permitted without interfering with the housing. The stem end 88 is also provided with an exhaust passage 96 leading from the chamber 89 (FIG. 1) which allows fluid to escape from the plunger tip 90 and this passage may be provided with a fitting to control the amount of air escaping. A tube 98 is threaded into the lower end of the passageway extension 97 in the stem end 88 and extends centrally downwardly through the hollow plunger tip 90 to a point spaced slightly above the closed lower end thereof. Thus, the cooling fluid will flow from the lower end of the tube into the hollow plunger at its lower end and then pass upwardly and finally out through the exhaust port 96.

The ring portion 86 of the housing 83 is adapted to slip into and out of a radially opening notch or socket 101 (FIG. 7) provided in the lower support plate 22. In cooperation with this notch is fitted a guide yoke or U-shape member 102 which rests on the upper surface of the plate 22 and is bolted thereto by the clamping bolts 103 provided with clearance in one yoke. The lower ring portion 86 of the housing 83 has an upper flange 104 and a lower flange 105, the upper flange being adapted to slip over the guide yoke 102 and rest on the upper surface thereof and the lower flange being adapted to slip beneath the lower surface of the plate 22. The upper flange 104 is notched at its radial inward side at 106 (FIG. 1) and the notch cooperates with an upstanding bolt 107 carried by the member 102 at its inward or closed side so as to accurately locate the ring portion 86 angularly when it is slipped into the member 102. It is retained in this position by means of the releasable latching units 100 (FIG. 7) provided on the member 102 at its outer ends.

Fastened to the lower side of the ring portion 86 of the housing 82 by the bolts 110 (FIG. 1) is a mold ring holder 111 which may be in the form of a split collar having an inner groove for receiving the peripheral flange 112 of the mold ring 113 which has a tapered lower portion adapted to center itself and nest in a complementally tapered upwardly opening annular socket 114 in the top of the cooperating mold M. The mold ring 113 will always be held in this cooperative relationship with the mold by means of the compression springs 25 acting on the lower plate 22. Of course, the mold ring 113 is provided with the usual central opening 115 downwardly through which the plunger tip 90 will snugly pass slidably into the cavity of the mold to press the glass charge supplied thereto and form the article G.

Figure 8:
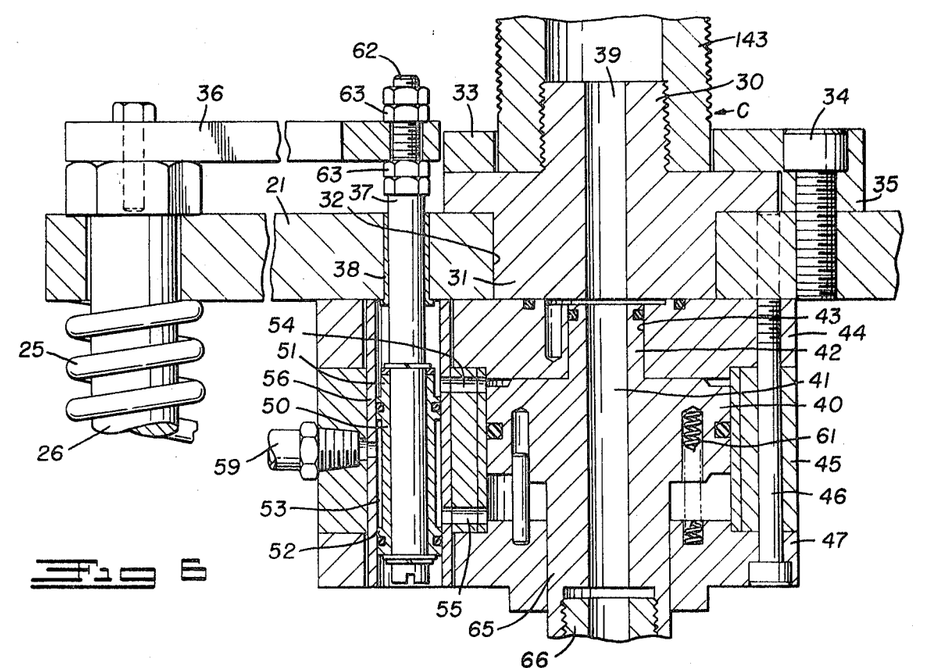
FIG. 8 is an enlargement of one of the latches of the structure of FIG. 7.
Figure 9:
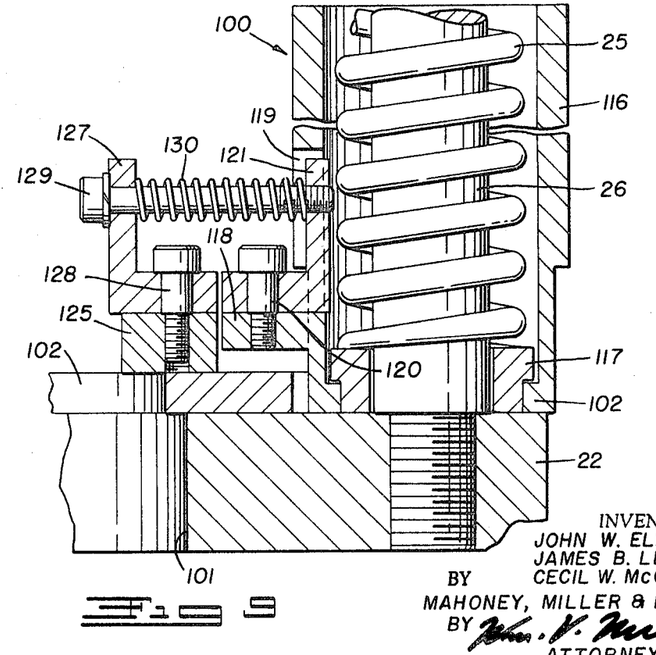
FIG. 9 is an enlarged vertical sectional view taken along line 9—9 of FIG. 7.

The latching units 100 are shown best in FIGS. 7–9. The unit 100 to the left of FIG. 7 is shown in released position while that to the right is shown in locking position. Each unit is carried by a sleeve 116 which is rotatably mounted on the plate 22 by the flanged retaining collar 117 (FIG. 9), disposed on the lower end of the rod 26 which it surrounds, as shown in FIG. 9. The sleeve 116 has an annular retaining lip 102 which cooperates with the flanged collar 117. The associated spring 25 has its lower end bearing against the collar 117. The sleeve 116 is provided with a radial ear 118 below a vertical slot 119 therein. Attached to the ear 118 by a bolt 120 is the outward radial arm of an L-shaped bracket 121 which has its vertical portion disposed in the slot 119. Pivoted at its inner end to the guide yoke 102 by a pivot bolt 122 is the latch member 125 which has a curved outer end 126 for engagement with the curved edge of the upper flange 104 of the ring portion 86. This outer end of the member 125 is pivoted to an L-shaped bracket 127, which is reversed relative to the L-shaped bracket 121, by means of a pivot bolt 128. The upstanding part of this bracket 127 slidably receives a headed pin 129 which has its inner end screwed into a tapped opening in the opposed upstanding part of the bracket 121. A compression spring 130 surrounds the pin 129 between the upstanding parts of the members 121 and 127. This arrangement serves as a past-center spring plunger device which will quickly move the latching member 125 to the retaining position shown in FIG. 8, and at the right of FIG. 7, or to the releasing portion indicated at the left of FIG. 7. It will be noted that member 125 is notched at its outer side to permit it to swing outwardly into association with the sleeve 116 when it is moved to releasing position. Also, the vertical slot 119 in the sleeve 116 provides clearance for the inner portion of the bracket 121 when it moves with the latch member 125 into latching position (FIG. 8). The latches are moved between their latching and releasing positions by manual rotation of the respective sleeves 116.

Figures 10, 11:
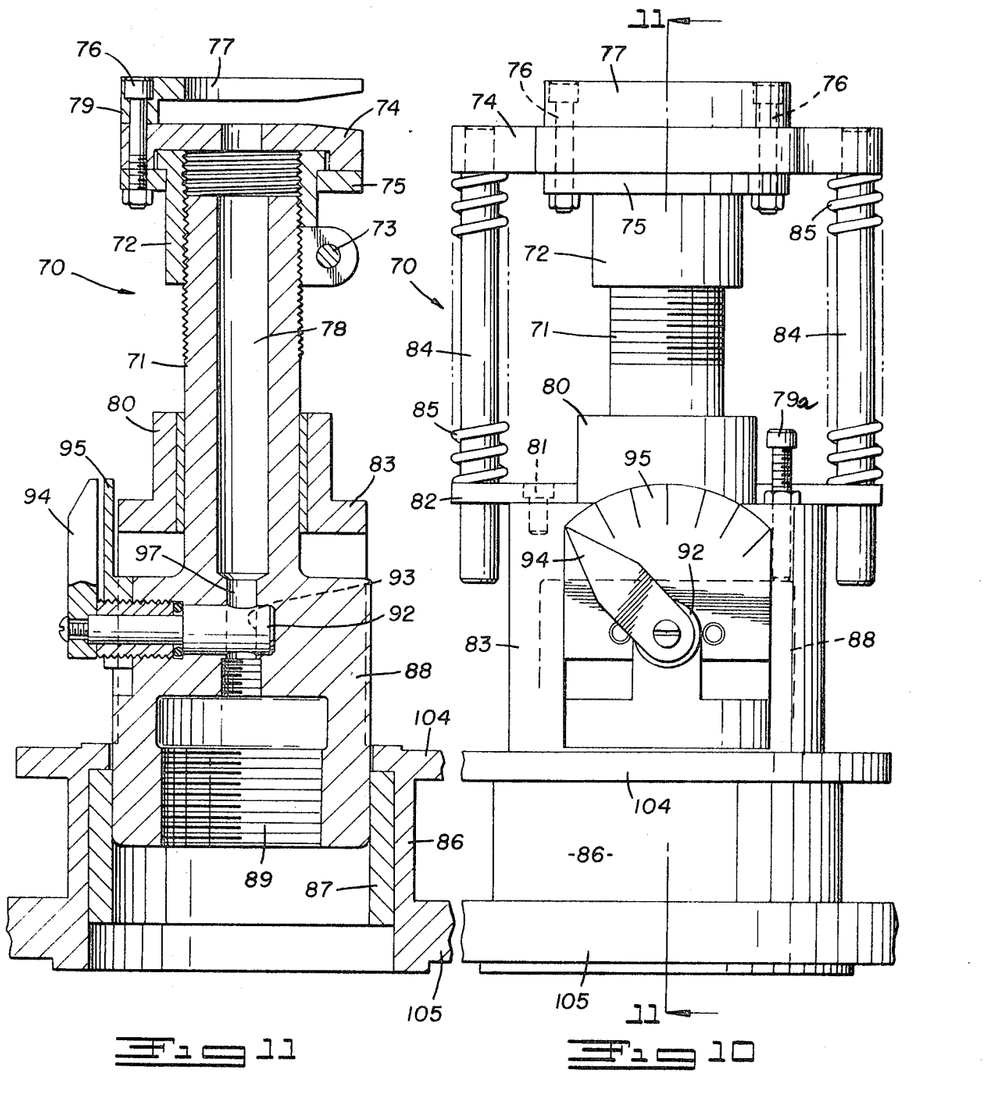
FIG. 10 is an enlarged side elevational view taken from the position indicated at line 10—10 of FIG. 1.
FIG. 11 is a vertical sectional view taken along line 11—11 of FIG. 10.

It will be apparent that the head unit 70 can be quickly slipped out of position and then be slipped back into position or be replaced by a different unit. To slip it out of position, it is merely necessary to manually release the latches 100 and then move it radially outwardly. Of course, it wil be understood that at this time the entire plunger assembly will be raised on the guide rods 159 to clear the plunger tip 90 of the mold M. All parts below and including the slip member 77, as indicated in FIGS. 10 and 11 will be removed as a unit. This member 77 will merely slide off radially the suspending adapter 66 and simultaneously the lower ring portion 86 will slide radially off the guide yoke 102 carried by the lower support plate 22. It will be noted that yoke 102 and yoke-like member 74 are reversed relatively. Replacement will be accomplished by the reverse operation and when the unit reaches its centered position relative to the mold, it will be retained in that position by swinging the latch members 125 to their inwardmost retaining positions. The centering of the head unit 70 relative to the mold M is readily accomplished. The parts 77 and 74 will slide onto the part 66 and clearance between these parts allows the necessary radial and lateral movement to line up the plunger tip 90 and ring 113 precisely with the mold M. At the same time the ring portion 86 will slide into the yoke 102 and fit exactly therein but the bolts 103 are loose at this time to permit necessary movement of the yoke on the plate 22 both laterally or radially after which it is locked by tightening the bolts. The accurate alignment of the plunger and mold thus obtained will be maintained and does not depend on alignment or accuracy of any other parts of the machine.

Figure 4:
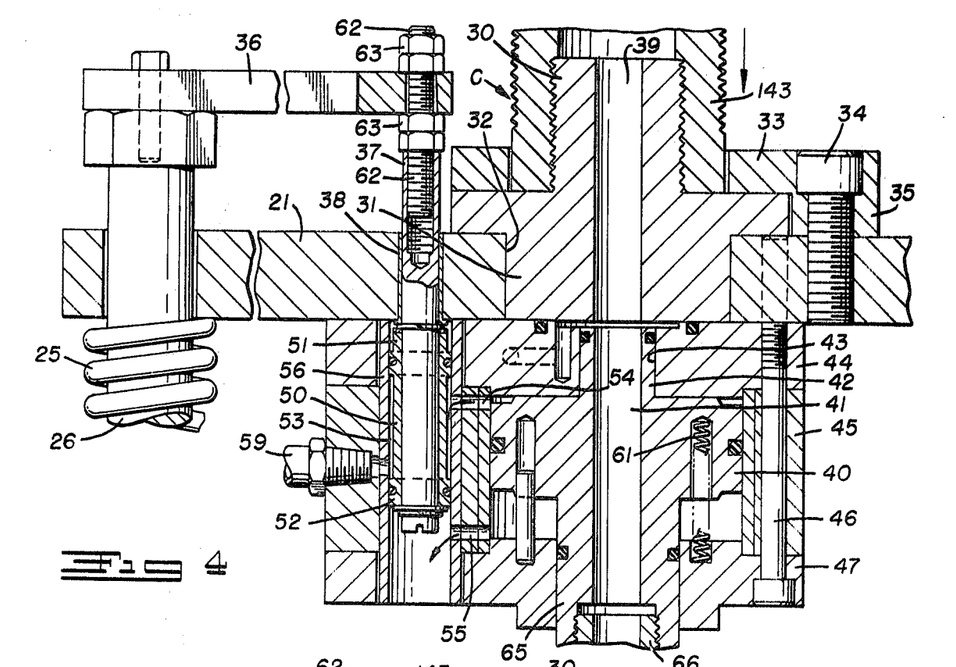
FIG. 4 is an enlarged vertical sectional view of the upper portion of the assembly illustrating the relative positions of various parts as the pressing or forming operation is accomplished.

With the unit 70 latched in operative position, the operation of the plunger assembly P in the pressing operation will be apparent from an inspection of FIGS. 1, 4, 5, and 6. In FIG. 1, the condition of the assembly is shown after the forming and setting of the glass article G has been completed and just prior to release of press head pressure. The start of the operation is indicated in FIG. 4 and at this time it will be assumed that the assembly has been lifted to its uppermost position by a suitable lifting force applied through the actuating rod 143 which, as indicated in the previous application, may be by means of mechanical means or fluid means or a combination of both, or in any other suitable manner. The timing of the actuation of the spool valve 50 is automatic in response to the vertical axial movement imparted to the head assembly by the rod 143.

Figure 5:
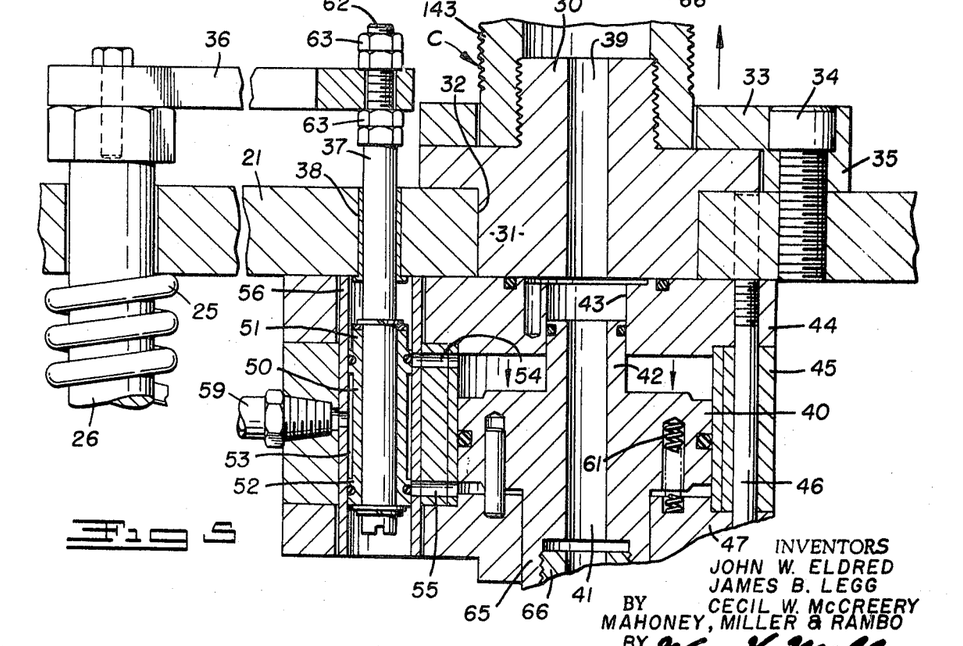
FIG. 5 is a similar view but showing the parts as the main forming pressure is relieved and the secondary or holding pressure is continued for further cooling and setting of the formed glass.

Assuming the plunger tip 90 is out of the mold cavity of the mold M which has been moved into vertical axial alignment therewith, the application of a downward force through the rod 143 will move the entire plunger head assembly P downwardly until the plunger tip enters the mold cavity of the mold M and the ring 113 seats in the upper end of the cavity. Further downward movement of the assembly by the rod 143 will cause the upper plate 21 to move toward the lower plate 22 and simultaneously compress the springs 25 and 85, maintaining firm contact of the mold ring 113 with the mold M during the pressing or forming operation on the glass therein and the subsequent cooling or setting period. The springs 85 will tend to bias the member 74, and the plunger stem 71 carried thereby, upwardly relative to the collar 80, as well as the piston 40 so as to tend to hold it in its uppermost position shown in FIG. 1 when there is no press head pressure downward by the rod 143. During the pressing operation, it will be apparent from FIG. 1 that the necessarily high forming pressure is applied by actual metal-to-metal contact through the various axially positioned members of the assembly which include, starting at the top, the adapter member 30, the piston 40, which will at this time have its upper portion in contact with the cylinder head 44, the lower guide portion 65, the adapter 66, the spacer 74, the nut 72, the plunger stem 71 and the plunger tip 90. Continuously cooling fluid, usually air, is passed downwardly through the plunger tip 90 to cool the tip during the forming and setting operation of the glass. At the time the plate 21 starts to move in the pressing operation downwardly, it will be in the position shown in FIG. 4 and the springs 25 and 85 will gradually be compressed. The plate 21 moves downwardly relative to the fixed stem 37 so that the valve spool 50 will be positioned within the valve sleeve 56 in its upper position to allow air to enter through the main inlet 59, the annular valve passageway 53 and the upper cylinder port 54 into the cylinder 45 above the piston 40. Also with this upper position of the valve spool, the lower side of the cylinder will exhaust through the lower cylinder port 55 and lower end of the valve sleeve 56. Air supplied above the piston 40 will not move it downwardly because of the indicated metal-to-metal contact of the various members until the downward movement of the rod 143 is reversed and it is moved upwardly by a lifting force, as indicated in FIG. 5. Then the piston will be held stationary in the downward position indicated in FIG. 5 to keep the plunger tip 90 in contact with the formed article in the mold as cylinder 45 is moved upwardly with the plate 21 by the springs 25 when the press head pressure exerted through the rod 143 is released. Thus, as the rod 143 reaches the extent of its downward movement and starts to move upwardly, as indicated in FIG. 5, the piston 40 is held downwardly by the air pressure in the upper end of the cylinder 45. This will keep the plunger tip in contact with the forming article G even though the heavy pressing force is relieved by the upward movement of the rod 143 and the metal-to-metal contact pressure is relieved at the top of the piston 40 by the upward movement of the plate 21 relative to the plate 22 caused by expansion of the springs 25. Holding the piston 40 downwardly during upward movement of the cylinder 45 with the plate 21 will hold the springs 85 compressed and the resulting force will act downwardly through the housing 83 to hold the mold ring 113 in position on the mold M even though the original force created by the springs 25 has been relieved. Upward movement of the cylinder 45 with the plate 21 will, as shown in FIG. 5, move the valve sleeve 56 upwardly relative to the valve spool 50 on the fixed stem 37 so that the spool will be positioned in its intermediate position within the sleeve to close both the lower and upper cylinder ports 55 and 56 to maintain fluid pressure on top of the piston 40. The conditions illustrated in FIG. 5 may be maintained as long as desired by interrupting upward movement of the rod 143 for a desired period depending upon how long it is desired to maintain contact of the plunger tip 90 with the formed article G in the mold to permit it to cool and set sufficiently. Then the rod 143 will be moved upwardly again so as to move the plate 21 farther upwardly, as shown in FIG. 6, under influence of the springs 25 and thereby lift the valve sleeve 56 relative to the fixed spool 50 so as to position the valve spool in its lower position within the sleeve and allow the exhaust of fluid from above the piston 40 outwardly through the upper cylinder port 54 and the supply of fluid through the lower cylinder port 55, from the annular chamber 53, into the cylinder 45 below the piston 40. Upward movement of the piston 40 will result from a combination of air pressure below the piston and the action of the springs 85 and 61. This will restore the assembly to the condition illustrated in FIG. 6. At all times, during the forming and setting operations, the springs 85 will hold the mold ring 113 in cooperative relationship with the upper end of the cavity of the mold M. When it is desired to remove the formed article from the mold, upward movement of the rod 143 will be continued sufficiently to lift the mold ring from the mold and the plunger tip to an elevated position above the mold to permit removal of the article by a suitable take-out device.

It will be apparent that this plunger head assembly provides an arrangement whereby the forming pressure is applied axially through the entire assembly by abutting members so that there is actual metal-to-metal contact. After the forming operation, the main forming pressure is relieved but the contact between the plunger tip and the article is maintained until cooling and setting of the glass and this is accomplished without stopping the machine, by having the limited relative axial movement of the lower plunger head unit relative to the upper supporting or suspending unit, with the secondary or holding pressure being maintained by the fluid pressure means which serves to connect the two units during the holding operation. The substitution of the fluid holding pressure means for the metal-to-metal contact after the forming operation results in simplification of the machine without interfering with its continuous operation. The assembly is self timing merely as a result of the vertical movement thereof resulting from vertical movement of the actuating rod. Also, another important improvement is the suspending of the lower head unit from the upper suspending unit so that it can be slipped in and out to permit ready replacement or substitution. This suspending arrangement also permits self-alignment of the plunger tip and mold ring relative to the mold. After accurate centering relative to the mold, the lower head unit is securely locked in position by the locking means which can be actuated without tools.

Having thus described this invention, what is claimed is:

1. A machine for forming glass or the like having a mold with an upwardly opening cavity for receiving molten glass to be formed and a plunger assembly including a depending plunger having a tip for cooperating therewith in pressing the glass in the mold, said machine also having primary pressure-applying means for producing relative axial movement of the plunger assembly and mold to develop primary pressure for pressing the glass in the mold and to relieve that pressure, said plunger including relatively vertically movable axially aligned pressure-transmitting members, said members including a piston and cylinder unit, an upper support from which said plunger is supported, a lower support having a guide portion through which said plunger extends, means for connecting said supports for relative vertical movement in response to actuation of said primary pressure-applying means, said axially aligned plunger members being brought together axially when the primary pressure is developed to cause said plunger tip to form the glass in the mold, means for supplying fluid pressure to said cylinder and piston unit to apply secondary holding pressure to said plunger tip when the primary pressure is relieved, and a control unit for controlling the flow of fluid to said cylinder and piston unit to apply the secondary holding pressure to keep said plunger tip in contact with the formed glass in the mold as the primary pressure is relieved, said control unit comprising relatively movable portions operatively connected respectively to said relatively vertically movable supports.

2. Apparatus according to claim 1 in which said control unit comprises a valve having relatively movable parts connected to the respective supports.

3. Apparatus according to claim 2 in which said mold has a mold ring that cooperates with the upwardly opening cavity, said plunger including a stem carrying said tip and mounted for vertical movement in said guide portion, said ring having an opening through which the plunger tip extends for vertical movement relative thereto, said lower support supporting said ring, said connection between said supports including yieldable means acting on said supports tending to keep them vertically apart.

4. Apparatus according to claim 3 in which said upper support comprises a support plate which carries the cylinder of said cylinder and piston unit, the piston of said unit being mounted for vertical movement in said cylinder and suspending said plunger stem, said primary pressure applying means comprising means for suspending the upper support plate and moving it vertically, said lower support comprising a plate, and said yieldable means comprising compression springs disposed between said plates, said control valve comprising relatively axially movable portions carried respectively by the two support plates so that relative vertical movement of said plates will axially move said valve portions to actuate the valve.

5. Apparatus according to claim 4 in which said plunger stem is mounted for axial vertical movement in said lower support plate in a mold ring supporting housing axially fixed in said plate and carrying said plunger guide portion, and yieldable means connected to said housing and said stem and tending to bias the stem upwardly relative to said upper support plate and the said piston upwardly within said cylinder.

6. Apparatus according to claim 5 in which the control valve is of the spool type having a spool and a sleeve, said spool being supported by and axially fixed relative to the lower plate and said sleeve being supported by and axially fixed relative to the upper plate.

7. Apparatus according to claim 6 in which said compression springs between said plates are carried by vertical rods anchored to the lower plate and slidable vertically in the upper plate, said compression springs being disposed around said rods between said plates, said valve stem being adjustably supported by one of said rods.

8. Apparatus according to claim 7 in which said yieldable means connected between said stem and said mold ring-supporting housing comprises compression spring units including pins anchored to a portion of said stem and slidably disposed in a portion of said housing, and compression springs around said pins and between said respective portions.

9. Apparatus according to claim 8 including adjustable stop means carried by said housing and engaging a portion of said stem to limit relative axial movement thereof.

10. Apparatus according to claim 5 in which said plunger tip is hollow and has an exhaust passageway leading therefrom, and fluid passageways leading axially downwardly through said upper support plate, piston and plunger stem into said hollow tip to supply cooling fluid into said tip.

11. Apparatus according to claim 10 including an adjustable valve cooperating with the passageways leading into said hollow tip for varying the amount of cooling fluid entering said tip.

12. Apparatus according to claim 5 including a slip joint for removably suspending said plunger stem from said piston and comprising a radially opening yoke on one of the members and a cooperating flange on the other of the members, and a slip joint for removably supporting said mold ring supporting housing on said lower plate and comprising a radially opening yoke in said plate and a flanged ring on said housing adapted to slide radially in and out of said yoke, said slip joints permitting radial movement of the stem and the ring supporting housing in the same direction, and releasable locking means for holding said stem and the ring supporting housing in the respective yokes.

13. Apparatus according to claim 12 including means for adjustably connecting said last-named yoke to said lower plate to permit centering of said housing when it is locked therein relative to said mold.

14. Apparatus according to claim 12 in which said locking means are carried by said lower plate and engage said ring supporting housing to position it in said cooperating yoke, said locking means comprising a plurality of locking units angularly disposed around said yoke and including spring-actuated beyond-center pivoted latches for engaging said ring supporting housing.

15. Apparatus according to claim 14 in which the ring supporting housing and yoke are provided with interfitting portions which cooperate to angularly position the ring supporting housing in the yoke.

References Cited

UNITED STATES PATENTS

| | | | |
|---|---|---|---|
| 1,931,375 | 10/1933 | Cook et al. | 65—172 |
| 2,966,006 | 12/1960 | Sherts et al. | 65—323 |

ARTHUR D. KELLOGG, Primary Examiner

U.S. Cl. X.R.

65—172, 319, 323, 362